UNITED STATES PATENT OFFICE.

GEORGE FREDRICK DAY, OF MUSQUODOBOIT HARBOR, NOVA SCOTIA, CANADA.

MEDICINE FOR ASTHMA.

SPECIFICATION forming part of Letters Patent No. 308,596, dated December 2, 1884.

Application filed March 24, 1884. (No specimens.)

*To all whom it may concern:*

Be it known that I, GEORGE FREDRICK DAY, of Musquodoboit Harbor, in the county of Halifax, of the Province of Nova Scotia, of the Dominion of Canada, have invented a new and useful Improvement in Medicinal Compounds for the Cure or Alleviation of Asthma, such being beneficial also in various other pectoral or bronchial diseases; and I do hereby declare the same to be described in the following specification.

The said composition consists of iodide of potassium, two ounces; ethereal tincture of lobelia, two ounces; tincture of lobelia, one ounce; tincture of asafetida, one ounce; amber or sugar sirup, ten ounces.

To prepare this medicine, the ingredients are to be thoroughly mixed or combined together, in which case it will be ready for use. The dose for an adult is a tea-spoonful in the morning and another in the evening. The iodide of potassium acts as an alterative upon lung-tissue, and serves as a restorative of the diminished or lost elasticity of the pulmonary air-cells. It aids also in expelling disease from the said tissue, the air-cells, and bronchial tubes. Asthma being a nervous affection, the asafetida, by being a powerful stimulant, anti-spasmodic, and expectorant, acts advantageously on the nerves of the lungs and bronchial system, it being assisted therein by the narcotic principle of the lobelia. The ethereal and the common tinctures of lobelia act as a sedative, an expectorant, and an anti-spasmodic, and tend to loosen the mucous deposits and provoke expectoration thereof, and, besides, operating to allay irritation of the lungs and bronchial tubes.

In practice the medicine has been found to be very beneficial, affording ready relief by allaying inflammation and strengthening and healing the diseased organs.

I do not confine my composition to the precise proportions as stated of its several ingredients, as such may be varied somewhat without materially changing or affecting it as a cure or alleviation of asthma and kindred diseases of the lungs or bronchial tubes.

I am aware that tincture of lobelia, iodide of ammonia, bromide of ammonia, and sirup of tolu have been mixed and used as a medical composition for the cure or alleviation of asthma, and therefore I make no claim to such, as I do not employ in my composition any bromide whatever, nor a sirup of tolu, and although I use an alcoholic tincture of lobelia, I use in connection therewith an ethereal tincture of lobelia, and besides such I use a tincture of asafetida, whereby my composition not only differs materially from that last mentioned, but is productive of different or better results.

I claim—

The medicinal composition substantially and for the purpose as described, it consisting of iodide of potassium, ethereal and common tinctures of lobelia, and asafetida, and a saccharine sirup, combined in or about in the proportions as specified.

GEORGE FREDRICK DAY.

Witnesses:
 E. G. SMITH,
 JOHN H. BARNSTEAD,
 JOS. SHENKILL.